United States Patent

Krishnakumar et al.

[11] Patent Number: 5,989,661
[45] Date of Patent: Nov. 23, 1999

[54] PRESSURIZED REFILL CONTAINER RESISTANT TO SPRUE CRACKING

[75] Inventors: Suppayan M. Krishnakumar, Nashua; Wayne N. Collette, Merrimack; Steven Giguere, Goffstown, all of N.H.

[73] Assignee: Continental PET Technologies, Inc., Florence, Ky.

[21] Appl. No.: 08/756,400

[22] Filed: Nov. 27, 1996

Related U.S. Application Data

[62] Division of application No. 08/412,807, Mar. 29, 1995, abandoned.

[51] Int. Cl.⁶ .................................................. B65D 90/02
[52] U.S. Cl. ..................... 428/35.7; 428/36.92; 215/382; 220/604; 220/675
[58] Field of Search ................... 428/35.7, 36.9, 428/542.8, 36.92; 215/370, 371, 382; 220/604, 669, 675

[56] References Cited

U.S. PATENT DOCUMENTS

| | | | |
|---|---|---|---|
| 3,786,221 | 1/1974 | Silverman | 219/10.57 |
| 4,035,455 | 7/1977 | Rosenkranz et al. | 264/40.3 |
| 4,044,086 | 8/1977 | McChesney et al. | 264/97 |
| 4,054,629 | 10/1977 | Wang et al. | 264/97 |
| 4,151,250 | 4/1979 | Barry et al. | 264/532 |
| 4,153,667 | 5/1979 | Brady et al. | 264/532 |
| 4,177,239 | 12/1979 | Gittner et al. | 264/530 |
| 4,465,199 | 8/1984 | Aoki | 215/373 |
| 4,496,517 | 1/1985 | Kinoshita et al. | 264/521 |
| 4,550,043 | 10/1985 | Beck | 428/36 |
| 4,725,464 | 2/1988 | Collette | 428/542.8 |
| 4,749,092 | 6/1988 | Suguira et al. | 215/382 |
| 4,755,404 | 7/1988 | Collette | 215/370 |
| 5,066,528 | 11/1991 | Krishnakumar et al. | 215/382 |
| 5,178,289 | 1/1993 | Krishnakumar et al. | 215/382 |
| 5,198,248 | 3/1993 | Krishnakumar et al. | 425/522 |
| 5,474,735 | 12/1995 | Krishnakumar et al. | 264/529 |

FOREIGN PATENT DOCUMENTS

| | | |
|---|---|---|
| 0 042 132 | 12/1981 | European Pat. Off. |
| 0 324 102 | 7/1989 | European Pat. Off. |
| 55-158811 | of 1980 | Japan . |
| 58-73710 | 5/1983 | Japan . |
| 6226785 | 8/1994 | Japan . |
| 1 237 402 | 6/1971 | United Kingdom . |
| WO 94/01268 | 1/1994 | WIPO . |

*Primary Examiner*—Rena L. Dye
*Attorney, Agent, or Firm*—Wolf, Greenfield & Sacks, P.C.

[57] ABSTRACT

A preform and container design for a pressurized refillable plastic container, such as a PET carbonated beverage container, having a base section with increased resistance to sprue cracking. Sprue cracking, which may be a problem in warmer climates, is believed to be caused in prior designs by an entrapment of material between the stretch rod tip and the blow mold base during blow molding of the container, which entrapment causes surface defects in the container adjacent the sprue. These surface defects expand during flexing of the container dome, caused by alternating cycles of thermal shrinkage and expansion during container cleaning and filling. Sprue cracking can be reduced by eliminating a depressed dish adjacent the sprue in prior known refillable containers, and may further be reduced by modifications to the preform and container wall thickness ratios and base clearance height.

21 Claims, 7 Drawing Sheets

PRESSURIZED REFILL CONTAINER RESISTANT TO SPRUE CRACKING

This application is a division of application Ser. No. 08/412,807, filed on Mar. 29, 1995 entitled PRESSURIZED REFILL CONTAINER RESISTANT TO SPRUE CRACKING, now abandoned.

FIELD OF THE INVENTION

The present invention relates to returnable and refillable pressurized containers, such as refillable PET carbonated beverage containers, and more particularly to such containers having a base structure with increased resistance to internal base or "sprue" cracking.

BACKGROUND OF THE INVENTION

The first commercially successful refillable PET carbonated beverage container, developed by Continental PET Technologies, Inc. in the 1980's, followed years of failed development attempts by others. The requirements for such a container included resistance to:

caustic stress cracking (due to repeated exposure to caustic cleaning agents at elevated temperatures, followed by repeated exposure to elevated internal pressure upon product filling)

dimensional instability (due to alternating cycles of thermal shrinkage and expansion)

base inversion or creep drop impact failure caustic whitening.

Prior development attempts may have satisfied one condition, while aggravating another. Disposable container designs were wholly unacceptable. Still further, a technically acceptable bottle design was required which could be sold at a price competitive with reusable glass containers. Once an acceptable refillable plastic container was found, it quickly eclipsed sales of returnable glass containers due to its light weight and shatter resistance.

Various embodiments of Continental PET's refillable preform and container designs are disclosed in U.S. Pat. Nos. 4,725,464, 4,755,404, 5,066,528, 5,198,248, and numerous foreign counterpart patents around the world.

An additional problem has been found with some refillable PET containers, especially those used in warmer climates—namely cracking around the sprue region of the interior base surface—referred to hereinafter as "sprue cracking." The "sprue" is an extended gate at the tip of the preform; the sprue cracks have occurred in the container around this central gate. Sprue cracking may prevent thorough cleaning of the container (i.e., contaminants may infiltrate the cracks), and/or the cracks may grow and result in a loss of pressurization and leakage of the bottle contents, i.e. a complete bottle failure. In addition, sprue cracking is undesirable because it causes whitening or opacity which is aesthetically undesirable and it also interferes with contaminant inspection, i.e., the inspection machinery considers the whitened or opacified region a contaminant and rejects the bottle.

All commercially-available refillable PET carbonated beverage containers are believed to provide a depression on the inner surface of the container base at the center of the dome, known as a "dish." Many commercial designs also have an external gate (projection) on the outer surface of the preform tip, and an internal dimple (projection) on the inner surface of the preform tip. The reason for the dish, gate and dimple is to ensure centering of the preform in the blow mold base.

Accurate centering is very important with a refillable bottle because it ensures that the standing ring (chime) region of the container base is blown to a uniform thickness. Without such uniformity, there is a tendency for the base to fail due to creep or caustic stress cracking. Thus, to ensure centering the external preform gate is positioned in a receptor (chamber) in the center of the blow mold base, and a dish-shaped opening in the mold base surrounding the receptor serves to guide the gate into the receptor. The internal preform dimple fits within a receptor on the tip of the axial stretch rod, to further ensure centering of the preform in the blow mold base. Still further, in the known processes there is a deliberate pinching (compression) of the preform end cap against the blow mold base, i.e., application of a compressive force, in order to hold the preform firmly in position during blowing and thus ensure accurate centering.

Thus, while the preform end cap has been carefully designed to satisfy the centering requirements, there has now been discovered a problem with sprue cracking for which neither the source nor the solution is known.

SUMMARY OF THE INVENTION

It is an object of the present invention to provide a new preform and container base design (and apparatus and method of making the same) which increases resistance to sprue cracking while still enabling accurate centering of the preform in the blow mold base. More specifically, both the source of the sprue cracking problem, and a solution, have been found.

It has been discovered that the prior known methods of holding the preform in the blow mold base cause an entrapment of material adjacent the sprue. During blowing, the entrapped material is stretched or pulled against the mold cavity, causing physical surface defects which initiate surface micro-cracking during container use and eventually result in visable sprue cracking. The present invention is a method of avoiding such entrapment.

The present invention involves several design changes to the preform and container base which may be used singly, or in combination, to reduce the sprue cracking problem.

A first design change is elimination of the dish in the blow mold and container base design. This eliminates the area of entrapment in the prior base designs. More specifically, the preform may be accurately centered in the blow mold base by the stretch rod tip contacting the preform only at the central preform tip, thus leaving the surrounding area free to be radially blown to form the surrounding dome area of the container base.

In a further specific embodiment, a minimum base clearance is provided, i.e., the height (vertical distance) from the plane of the standing ring to the highest point of the container dome (not including any axial gate extension). This minimum base clearance may be defined as a ratio of the dome height (h) to standing ring diameter (d) of at least on the order of 20%, and more specifically on the order of 20–35%. This ratio h/d provides sufficient base height and orientation in the dome region so that base inversion and/or excessive creep is avoided.

In a further specific embodiment, a wall thickness ratio is specified for the preform base and/or container base. More specifically, the preform wall thickness at the central dome-forming region $t_s$, compared to the wall thickness at the chime-forming region $t_c$, is on the order of 50–75%, and more preferably $t_s/t_c$ is on the order of 55–70%. This provides an increase in thickness of the preform end cap (not including any internal dimple or external gate) as compared to the prior known refill preform and reduces flexing of the resulting container base (which may lead to sprue cracking). With prior designs, the base (especially the dome) will "flex" (move) inwardly and outwardly during the alternating cycles of shrinkage (caused by exposure to hot caustic cleaning agents) and expansion (caused by internal pressurization due to product filling). This flexing causes the growth of surface defects or cracks and may lead to ultimate failure of the bottle. Also, the thickened preform tip remains cooler during preform reheating (prior to stretch blow molding) and the cooler tip is less likely to move or "slip" when held in position by the tip of the axial stretch rod in order to ensure adequate centering. While the preform tip is thickened, it is still thinner than the chime-forming region of the preform base; the reason is that a continuously thickened preform base may produce excessively thick areas or lumps in the container dome, which discontinuities lead to stress cracking.

A wall thickness ratio for the container base is similarly defined—i.e., the thickness $T_S$ at the center of the dome (excluding any internal dimple or external gate) compared to the thickness $T_C$ of the standing ring (chime). In a specific embodiment, this thickness ratio $T_S/T_C$ is on the order of 1.4 to 1.9. In one embodiment, the dome center thickness $T_S$ extends for up to about 20% of the container diameter. The resulting dome is thick enough to resist flexing, while the central preform tip is still cool enough after reheating to ensure accurate centering in the blow mold.

In further specific embodiments, an external gate and/or internal dimple may be added to the preform to further ensure accurate centering of the preform in the blow mold.

These and other advantages of the present invention will be more particularly described with respect to the following detailed description and drawings.

DETAILED DESCRIPTION

The prior art preform and container base illustrated in FIGS. 1–4 is representative of the known refillable container design described in U.S. Pat. No. 5,066,528 to Collette et al., which issued Nov. 19, 1991.

Figure 1:
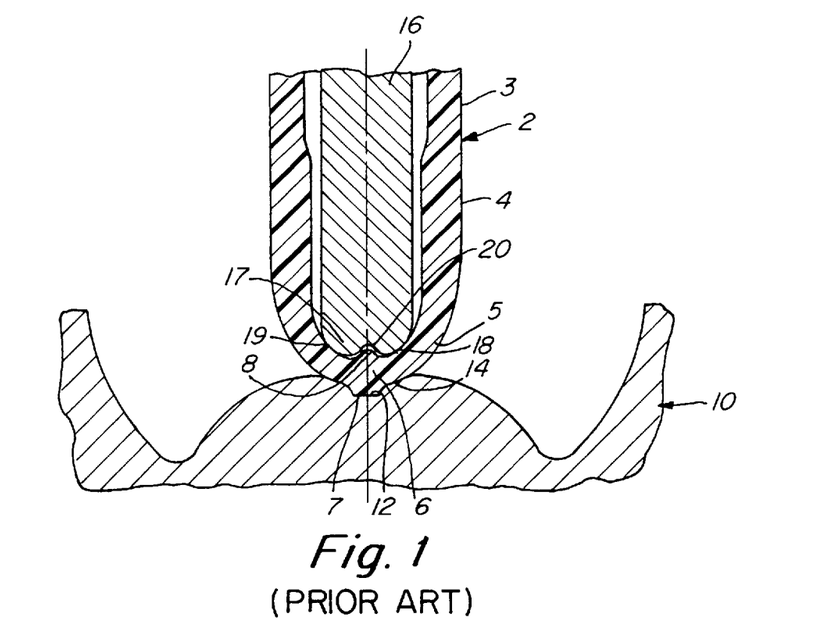
FIG. 1 is a schematic illustration of a prior art preform base for blow molding a refillable container.

FIG. 1 illustrates the lower portion of the known preform 2, including a sidewall-forming portion 3, an upper chime-forming portion 4 which is thickened relative to the sidewall-forming portion 3, and a lower dome-forming portion 5 having a reduced wall thickness compared to the upper portion 4. The preform end cap includes a central sprue region 6 having an external gate 7 and an internal dimple 8. The gate 7 is positioned within an axially elongated receptor 12 in the center of blow mold base 10; inwardly concave surfaces 14 on either side of the receptor form a dish for guiding the gate 7 into the receptor 12. Inside the preform there is a stretch rod 16 for axially elongating the preform; the stretch rod has a tip 17 with a central receptor 20 for receiving the preform dimple 8, and rounded outer tip edges 18 and 19 for engaging the preform end cap at two positions spaced from the center of the end cap.

Figure 2:
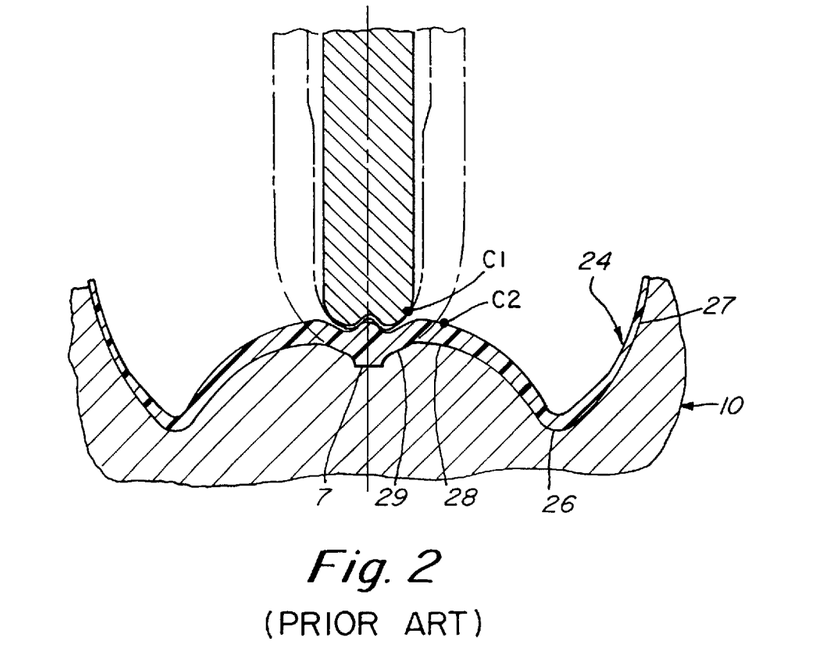
FIG. 2 is similar to FIG. 1, further showing the container base blown from the preform.

As further illustrated in FIG. 2, the known preform structure 2 is expanded to form a champagne-type base 24 including a standing ring or chime 26, and within the chime, a pushed-up dome 28. At the center of the substantially hemispherical outwardly concave dome 28 there is an axially elongated gate 7 (same as in the preform) and surrounding the gate an outwardly convex dish 29 formed by the dish region 14 of the blow mold. The container base further includes an outwardly convex outer wall 27 between the chime 26 and container sidewall (not shown).

FIG. 2 shows contact points C1 and C2 which are used to illustrate the material entrapment problem which may lead to sprue cracking in the known design. More specifically, contact point C1 is where the outer tip 18 of the stretch rod contacts the inner surface of the preform and exerts a compressive force, in order to hold the preform in the blow mold for secure centering during blow molding. (Note: the compressive force is established by setting the lowermost point of the stretch rod below the position of the inner preform surface.) During blow molding, the material at point C1 is radially stretched outwardly and thereafter resides at point C2; during this radial expansion, the inner surface of the preform contacting point is pulled along the surface 18 which may cause surface defects that later initiate microcracks and grow into sprue cracks. The reason these small surface defects expand and grow into large sprue cracks, is illustrated in FIG. 3.

Figure 3:
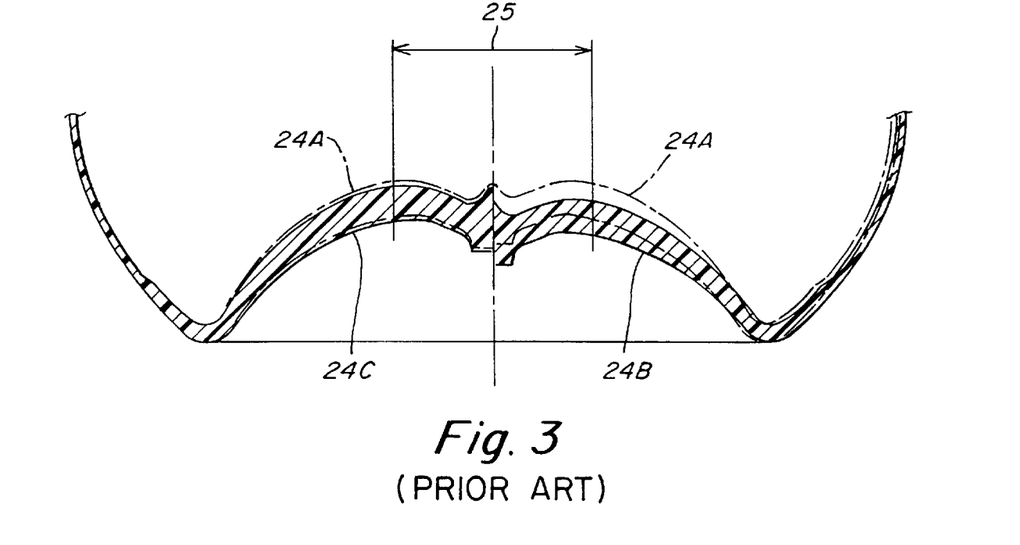
FIG. 3 is an exploded sectional view of the prior art container base of FIG. 2, further illustrating movement of the base due to thermal changes and pressurization.
Figure 4:
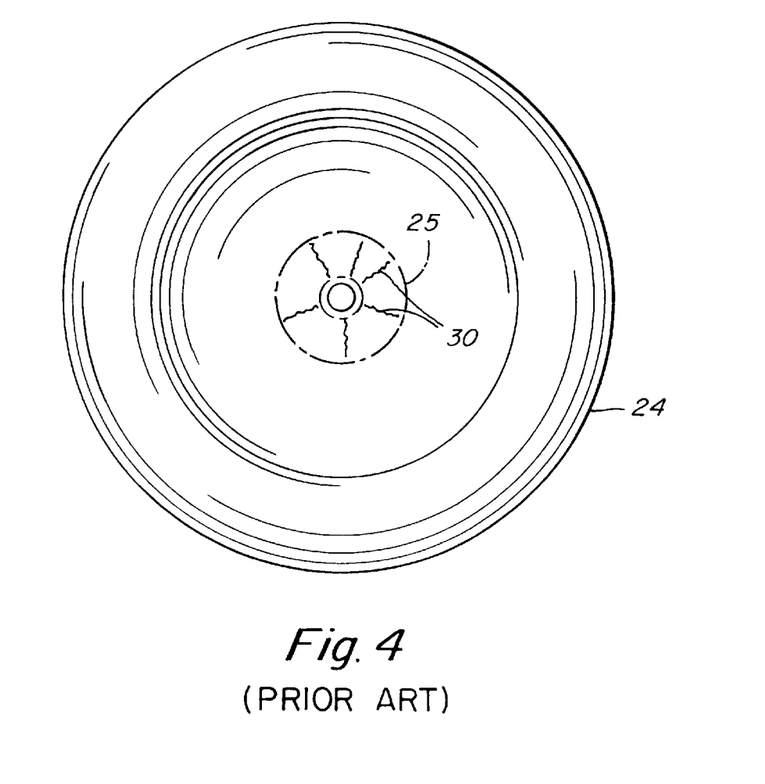
FIG. 4 is a bottom view of the prior art container base of FIG. 3, showing radial sprue cracking.

FIG. 3 shows the flexing of the known refillable container base 24 during use which leads to expansion of the sprue cracks. The initial container base as molded is shown in dashed lines 24A. After filling with a pressurized liquid, the base may move outwardly due to the high internal pressurization and assume position 24B. After caustic washing (at elevated temperatures) and prior to refilling, the base is likely to shrink and move back upwardly to position 24C. It is this caustic wash exposure and the repeated inward and outward flexing, especially in the central dome region of the base, which causes the surface defects on the inner walls of the preform adjacent the sprue, to expand and form the radial sprue cracks 30 shown in FIG. 4. The area of sprue crack initiation extends for about 20% of the container diameter around the sprue.

A specific embodiment of the invention, and several alternative embodiments, will now be described.

Figure 5:
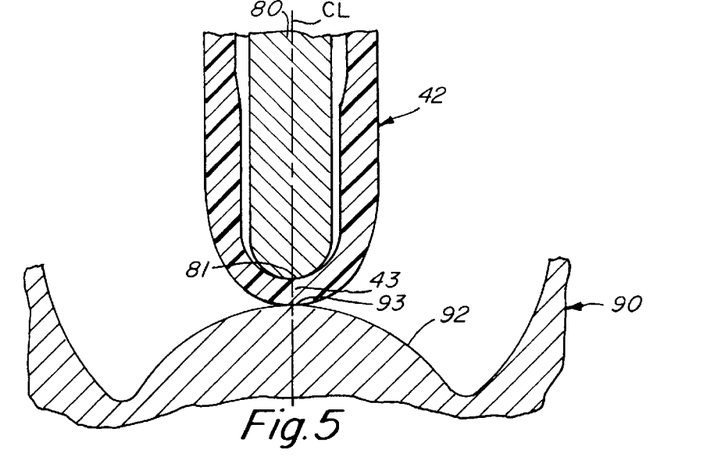
FIG. 5 is a schematic illustration of a preform base according to this invention, positioned in a blow mold base.
Figure 6:
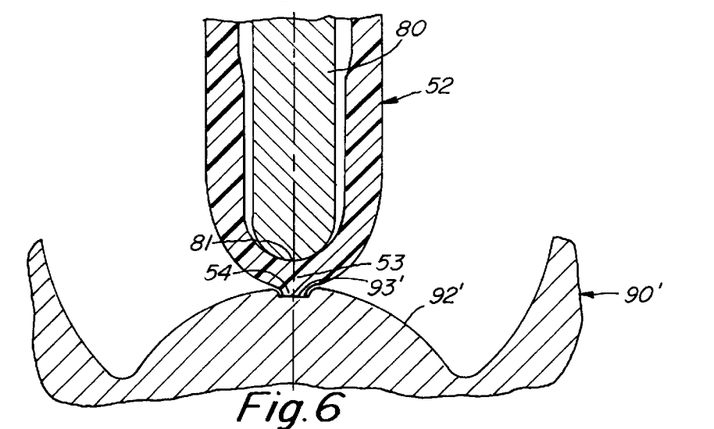
FIG. 6 is similar to FIG. 5 but shows an alternative preform embodiment including an external gate.
Figure 7:
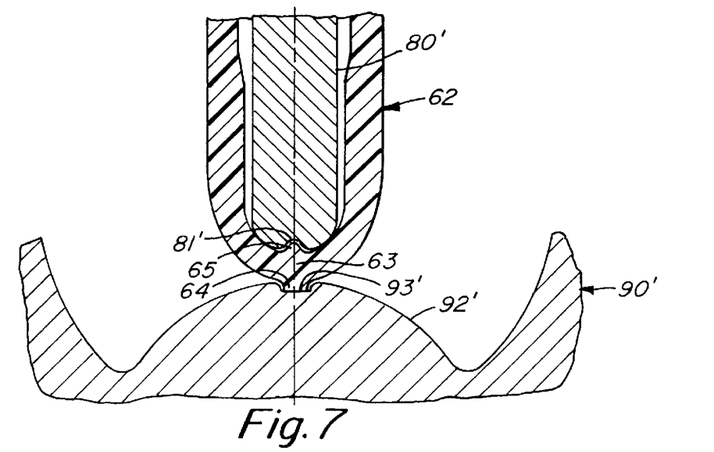
FIG. 7 is similar to FIG. 6 but shows a further preform embodiment including an external gate and internal dimple.

According to this invention and as shown in FIGS. 5–7, a modified blow mold base is utilized which eliminates the dish adjacent the gate receptor in the known blow mold base. A preform 42 has a central tip section for forming the center of the container dome 43, which in this embodiment is without an external gate or internal dimple. A stretch rod 80 has a lowermost tip 81 which contacts the central section 43 of the preform, and holds it against the central uppermost point 93 of a substantially hemispherical dome 92 of outer base mold 90. The central point of contact between the stretch rod, preform and blow mold holds the preform section 43 securely in position for accurate centering (which central preform section is preferably thickened as described hereinafter), and during radial expansion of the preform there is substantially no material entrapment or damage to the preform surface due to movement along the stretch rod tip, which in the prior art caused sprue cracks to initiate.

FIG. 6 shows an alternative embodiment in which a preform 52 further includes an external gate 54 at the central section 53. The same stretch rod 80 is used, and a similar base mold 90' which in this case further includes an axially elongated receptor 93' (at the center of the dome) for receiving preform gate 54. The addition of gate 54 and receptor 93' further enhances centering of the preform, but does not provide an area for material entrapment and/or surface marking of the preform.

FIG. 7 shows a further alternative preform 62 in which the central section 63 includes both an internal dimple 65 and external gate 64. In this case a modified stretch rod 80' is used having an internal receptor 81' for receiving the preform dimple 65. Similar to FIG. 6, the outer blow mold base 90' includes a central gate receptor 93'. Use of both the internal dimple and external gate further enhances centering, without causing material entrapment or surface damage.

Figure 8:
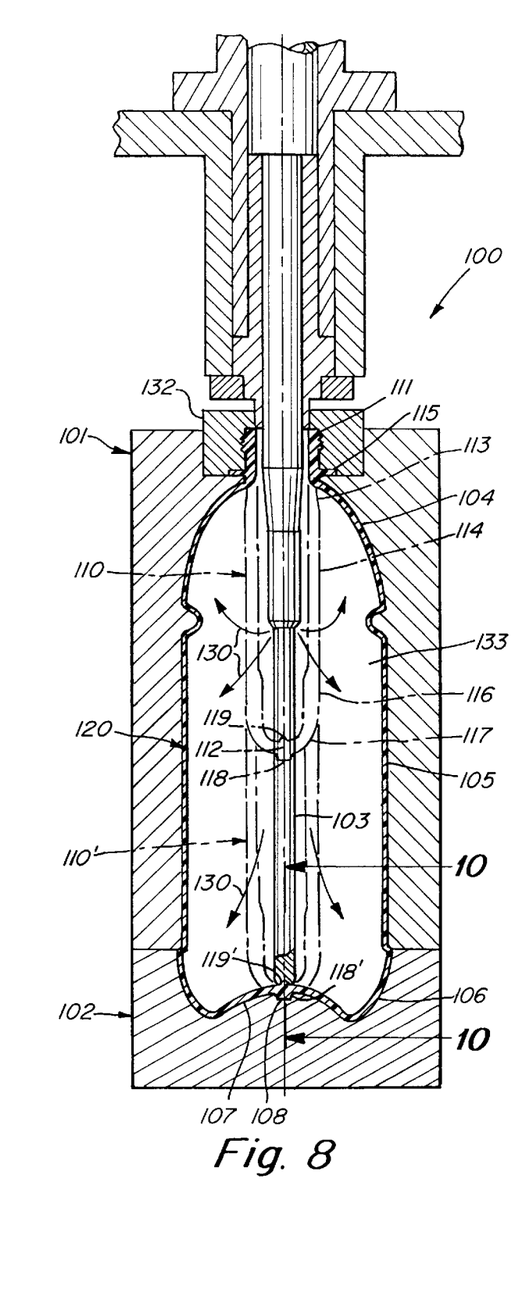
FIG. 8 is a sectional view of a stretch blow-molding apparatus showing a preform and the resulting container of this invention.
Figure 9:
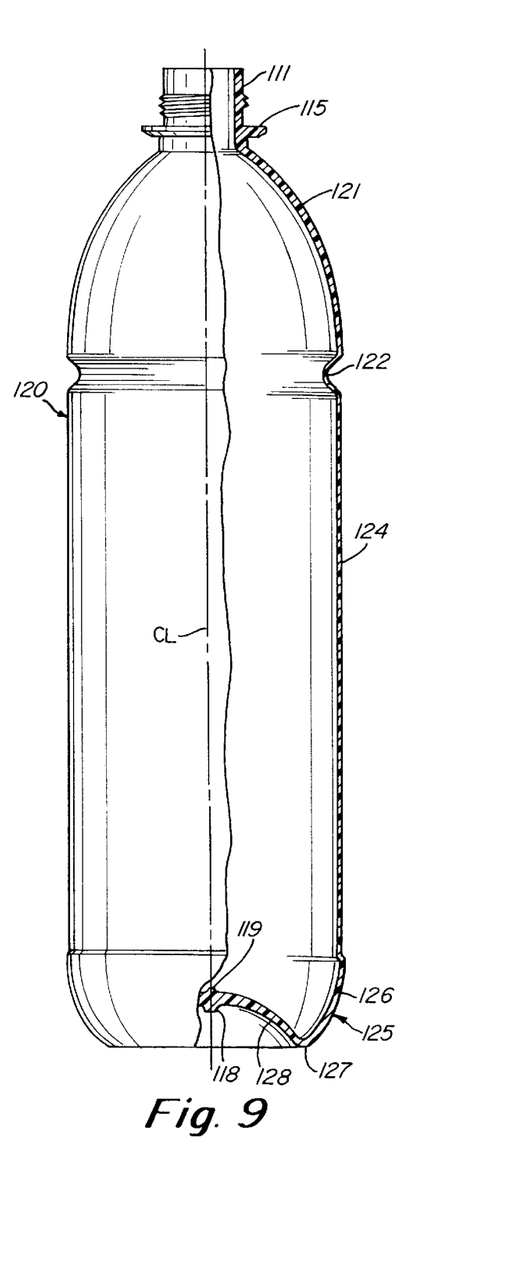
FIG. 9 is a side elevational and partial sectional view of a container having a base made according to this invention.

FIG. 8 shows a stretch blow-molding apparatus 100 for expanding a preform into a container according to the present invention. The resulting container is shown in FIG. 9. A preform 110 of polyethylene terephthalate (PET) is positioned in a blow mold apparatus 100. The preform includes an open top end having a neck finish 111 with external screw threads and a retaining flange 115. Below the neck finish there is provided a body-forming portion, including a tapered shoulder-forming portion 113 of increasing wall thickness moving down to a substantially constant wall thickness cylindrical sidewall-forming portion 114. Below 114 is a base-forming portion 115, including an upper thickened portion 117 and a lower tapering portion 116 of reduced wall thickness, including a bottom end cap with central sprue region 112 having an external gate 118 and internal dimple 119 (same as embodiment shown in FIG. 7).

Preform 110 is injection molded and is substantially transparent and amorphous. It is heated to a predetermined temperature in the orientation temperature range of the polymer, which generally is about 20°–50° C. above the glass transition temperature ($T_G$ for an amorphous PET preform is about 76–80° C., and the upper end of the orientation temperature range is preferred for refill containers).

As shown in FIG. 8, the retaining flange 115 in the preform lies between a collet 131 and a neck plate 132 which fits within an upper mold part 101 of the blow-molding apparatus. Upper mold 101 and lower mold 102 together form an interior chamber 133 which defines the dimensions and contours of the final container. Upper mold 101 includes an upper conical shoulder-defining wall 104, and cylindrical sidewall-defining wall 105. The lower mold 102 includes an outer basewall-defining wall 106 and a central recessed dome-defining wall 107 (i.e., a champagne-type base). At the center of the base, a receptor 108 is shaped to receive the preform gate 118.

The heated preform 110 is axially elongated by stretch rod 103, to form elongated preform 110'. The tip of the stretch rod engages dimple 119 and the central sprue region of the preform, holding the preform gate 118' in receptor 108. This helps center the elongated preform in the blow mold, which is important for even orientation and expansion around the entire circumference of the container. A pressurized fluid is then injected into the preform (shown by arrows 130) for radially expanding the preform into a container which assumes the shape of the inner mold walls.

The resulting container 120, as shown in FIG. 9, includes an open top end with the same unexpanded and substantially amorphous neck finish 111, with external screw threads and retaining flange 115, as in the preform. A tapered shoulder 121 increases radially in diameter going down towards a sidewall 124; the shoulder has undergone significant axial and radial expansion so as to provide significant strain-induced crystallization. The shoulder 121 is separated from the sidewall 124 by a recessed ring 122. The cylindrical sidewall 124 (defined by the central axis of the container CL) is the largest diameter portion of the container and has undergone the most axial and radial expansion; it thus has the highest level of average strain-induced crystallinity. Because the preform base is relatively thicker than the preform sidewall, and because of its hemispherical shape (requiring a higher pressure to blow) and generally lower temperature after reheating, the base undergoes relatively little axial and radial expansion. A thickened substantially amorphous container base has been found to provide increased resistance to stress cracking and creep for refill applications. The champagne-type base of the container 120 includes an outer base wall 126 reducing in diameter towards a lowermost chime 127 on which the container rests. Radially inwardly of the chime is a central recessed dome 128, including the inner dimple 119 and external gate 118 (as in the preform). As shown in FIG. 9, the base, which undergoes significantly less expansion than the sidewall and shoulder, is of increased thickness in order to compensate for the lower crystallinity of the base.

Figure 10:
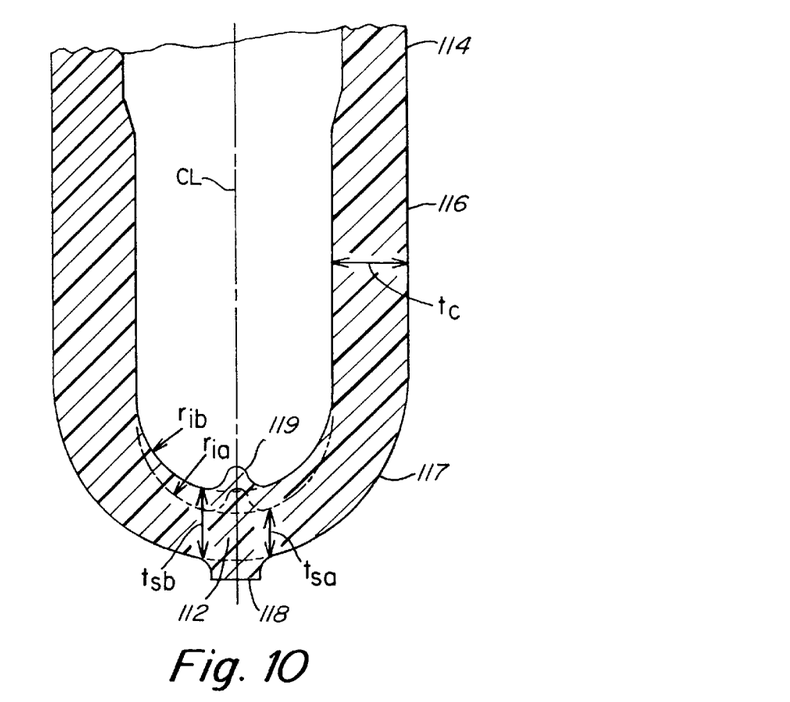
FIG. 10 is a cross-sectional view of the preform base of this invention, and comparing the wall thickness of a prior art preform base.

FIG. 10 illustrates in greater detail the new preform base-forming structure, and compares it to the prior art base-forming structure. The new preform base includes an upper thickened chime-forming base portion 116 having a wall thickness $t_c$ and a lower tapered dome-forming portion 117 having a wall thickness $t_{sb}$ in the center dome-forming region 112 adjacent the central preform axis CL. The preform end cap includes an external gate 118 and internal dimple 119, which are not included in the thickness $t_{sb}$. The inner surface of the end cap is defined by a radius $r_{ib}$. As shown, the end cap radius $r_{ib}$ reduces the wall thickness in the end cap, as compared to the upper thicker portion 116. However, in contrast to the prior known refill preform defined by inner radii $r_{ia}$, having a thickness $t_{sa}$, the new refill preform design has a thicker end cap. As previously discussed, this thicker end cap tip region enhances secure centering of the preform in the blow mold.

Figure 11:
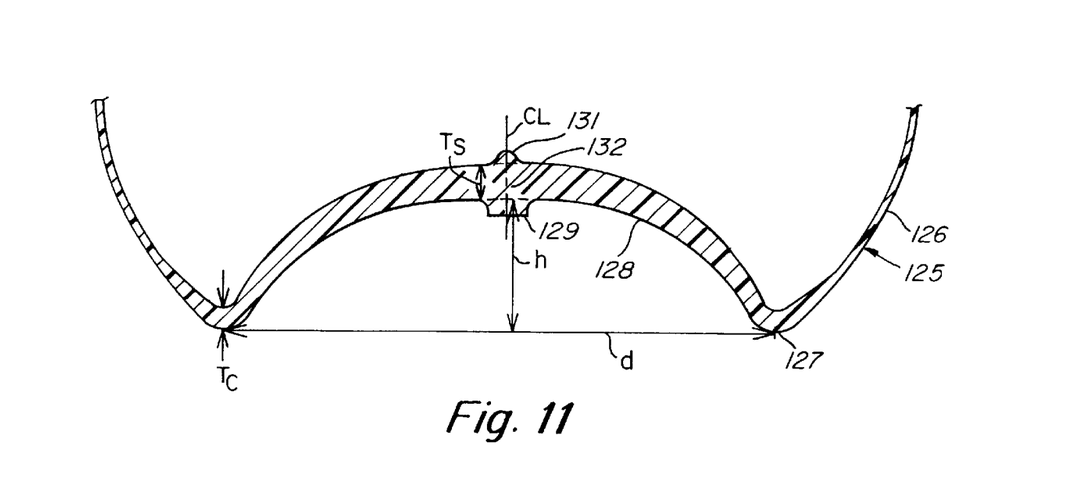
FIG. 11 is a cross-sectional view of a container base made from the preform of FIG. 10, and illustrating the minimum base clearance.

FIG. 11 illustrates the new container base design. The container base 125 includes outer wall 126, standing ring chime 127, and central dome 128 with external gate 129 and inner dimple 131. The center dome region at 132 (adjacent central container axis CL) has a wall thickness $T_S$ (not including the external gate 129 and internal dimple 131). The wall thickness at the chime 127 is defined by $T_C$. In the embodiment described herein, the ratio of the center dome wall thickness to the chime wall thickness, $T_S/T_C$, is on the order of 1.4 to 1.7. This wall thickness reduces flexing of the dome in order to minimize sprue cracking, and provides a substantially thick sprue region for adequate centering. It also provides adequate chime thickness for resistance to caustic stress cracking.

In addition, there is a minimum base clearance ratio of dome height h (not including the external gate 129) to standing ring diameter d of at least on the order of 20%; preferably the ratio h/d is on the order of 20–35%, and more preferably 25–30%. This ratio ensures adequate strength (i.e., base orientation and thickness) for resistance to creep and base inversion.

FIGS. 12–15 illustrate a modified injection molding method in order to further minimize sprue cracking.

Figure 12:
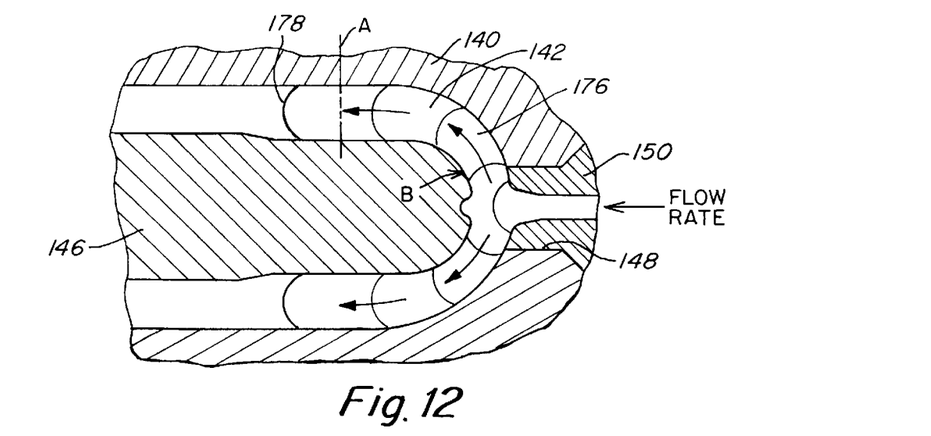
FIG. 12 is an exploded sectional view of the gate section of an injection molding apparatus illustrating the flow of material into the mold.
Figure 13:
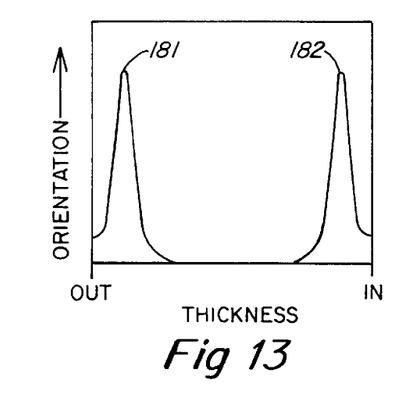
FIG. 13 is a graph of orientation across section A—A of the preform base of FIG. 12, showing the areas of high shear orientation adjacent the inner and outer surfaces of the preform.
Figure 14:
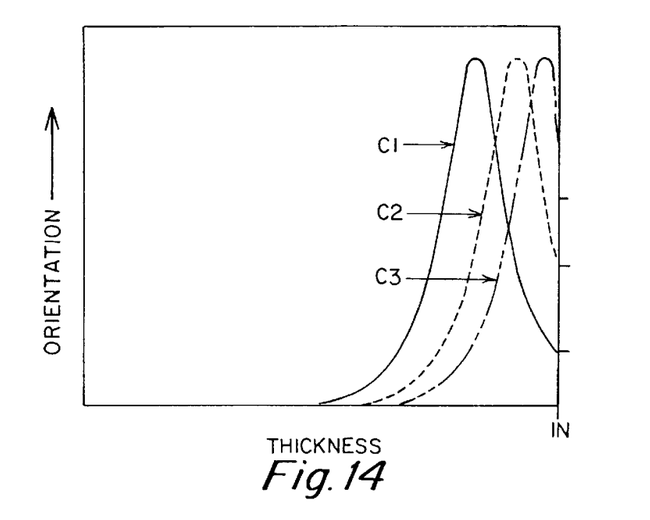
FIG. 14 is similar to FIG. 13 but illustrates alternative embodiments in which the area of high shear orientation is moved inwardly away from the outer surface of the preform.
Figure 15:
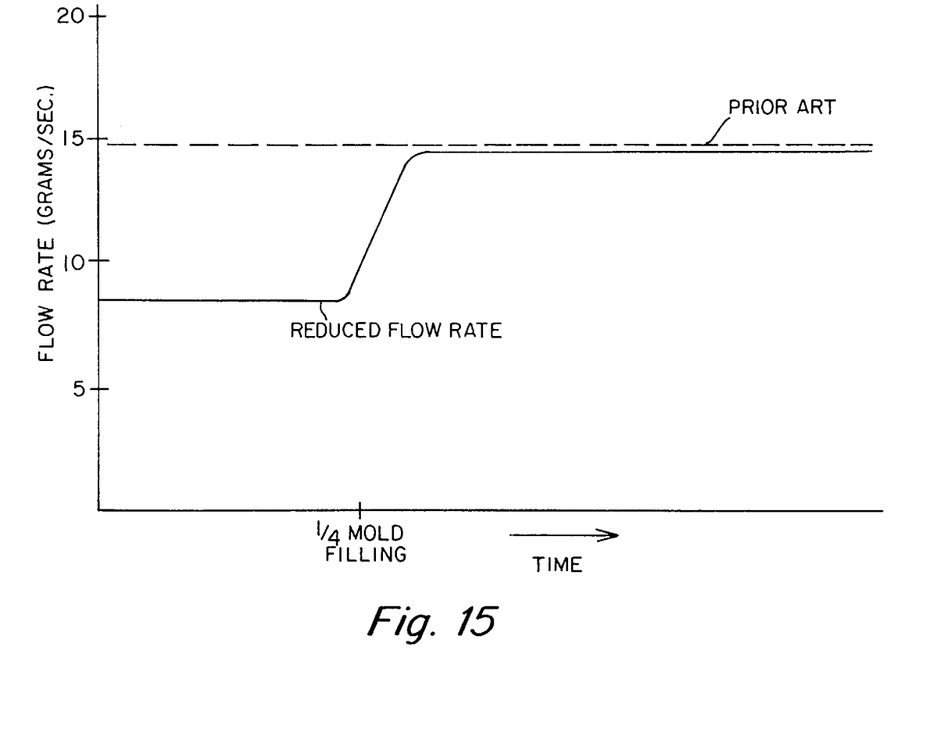
FIG. 15 is a graph of a modified flow rate into the injection mold, versus time, in order to reduce shear orientation at the surface.

The preform injection mold unit includes an outer mold cavity 140 and core 146, between which is defined a chamber 142. The bottom end of the mold has an opening 148 which receives in sealed relation a nozzle-like end 150 of an extruder. A preselected amount of resin is injected into the bottom of the mold cavity and as it flows through the mold cavity, and due to the relatively cool temperatures of the mold cavity 140 and core 146, there will be a parabolic-shaped flow front 178 and solidification of the resin 176 to define solidified inner and outer layers of the resin along the mold walls. At high flow rates, a high level of shear adjacent the inner and outer mold walls produces shear orientation peaks 181, 182 across the preform thickness as shown in FIG. 13 (taken at the cross-section A—A for the thickened upper portion of the preform base as shown in FIG. 12). At the reduced thickness end cap area B shown in FIG. 12, an even higher shear rate is induced by the reduced width of the mold chamber 142. This produces a very high level of surface orientation adjacent the inner mold wall, as shown by curve C3 in FIG. 14. To compensate for the reduced width of the mold at the end cap of the preform (as compared to the upper base-forming portion of the preform), it may be desirable in specific embodiments to reduce the initial flow rate of resin into the preform mold in order to reduce the level of orientation at the surface; curves C2 and C1 in FIG. 16 illustrate progressively lower levels of surface orientation at point B. FIG. 15 illustrates a modified injection flow rate over time; in comparison with a steady flow rate of about 15 grams per second in the prior art, the modified flow rate has an initial reduced flow rate of about 10 grams per second for an initial one quarter mold filling time, and then increases to a higher level of about 15 grams per second for the remaining mold filling time. This modified injection rate will reduce the levels of radial flow orientation at the surface of the end cap, which will reduce the incidence of radial sprue cracking initiating and expanding along these radial flow orientation lines.

The following is a specific example of a refillable carbonated beverage container made according to the present invention.

EXAMPLE

A single-layer preform is provided of polyethylene terephthalate copolymer having about 2% copolymer content, which is sold under the trade name GY8006 by the Goodyear Tire and Rubber Company, Ackron, Ohio. The polymer has an intrinsic viscosity of 0.80 measured in 60/40 phenol-tetracholorethane at 25° C. The preform has a length of about 125 mm, an outer diameter of about 30 mm, and a wall thickness in the cylindrical sidewall-forming portion of about 5.9 mm. The preform is substantially transparent and amorphous, having a percent haze of less than 20%.

The sidewall-forming portion is axially elongated about 2.8× and radially expanded about 3.5×. The final container is held in the mold at about 40 atm for about 2.0 seconds, after which the pressure is released and the container removed from the mold.

In this specific example, the neck plate is cold, e.g., a surface temperature of about 10° C., the upper mold is warm and has a surface temperature of about 88° C., and the lower mold has a surface temperature of about 10° C. Just prior to axial and radial expansion, the body-forming portion of the preform has an average temperature of about 117° C.

The container has a cylindrical sidewall with an average crystallinity of about 18%. The final container has a volume of 1.5 L, a height of about 330 mm, an outer diameter of about 95 mm, and a cylindrical sidewall thickness of about 0.47 mm.

The relative preform and container wall thicknesses are:

$t_c$=7.0 mm $t_s$=4.75 mm $T_C$=2.4 mm $T_S$=3.9 mm and the dome height h=16.75 mm and standing ring diameter d=63.0 mm.

The percent crystallinity is determined according to ASTM 1505 as follows:

$$\% \text{ crystallinity} = [(ds-da)/(dc-da)] \times 100$$

where ds=sample density in g/cm³, da=density of an amorphous film of zero percent crystallinity (for PET 1.333 g/cm³), and dc=density of the crystal calculated from unit cell parameters (for PET 1.455 g/cm³). By "average" crystallinity is meant an average taken over the entire area of the respective container part, i.e., cylindrical sidewall portion.

If desired, the crystallinity may be further enhanced by heat setting according to known heat setting procedures. For PET, a suitable heat setting temperature is about 200–250° C. for a time period of about 10 sec. Such heat setting is not required, but may be desirable in certain applications.

The container of this invention is particularly useful as a refillable carbonated beverage container able to withstand numerous refill cycles while maintaining aesthetic and functional features. A test procedure for simulating such a cycle without crack failure and with a ±1.5% maximum volume change is as follows.

Each container is subjected to a typical commercial caustic wash solution prepared with 3.5% sodium hydroxide by weight and tap water. The wash solution is maintained at the desired wash temperature, e.g., 60° C., 65° C., etc. The bottles are submerged uncapped in the wash for 15 minutes to simulate the time/temperature conditions of a commercial bottle wash system. After removal from the wash solution, the bottles are rinsed in tap water and then filled with a carbonated water solution at 4.0±0.2 atmospheres (to simulate the pressure of a carbonated soft drink container), capped and placed in a 38° C. convection oven at 50% relative humidity for 24 hours. This elevated oven temperature is selected to simulate longer commercial storage periods at lower ambient temperatures. Upon removal from the oven, the containers are emptied and again subjected to the same refill cycle, until failure.

A failure is defined as any crack propagating through the bottle wall which results in leakage and pressure loss. The volume change is determined by comparing the volume of liquid the container will hold at room temperature, both before and after each refill cycle.

The container can preferably withstand at least 10 refill cycles, and preferably 20 refill cycles at a wash temperature of at least 60° C. without failure, and with no more than about ±1.5% volume change in total.

For use as a refillable container, the dome and chime form a thickened base portion having about 3–4 times the thickness of the cylindrical sidewall, and having an average crystallinity of no greater than about 10%. Radially outwardly of the chime, there is a thinner outer base portion of about 50–70% of the thickness of the thickened base portion and increasing in crystallinity up to its junction with the sidewall. The thinner outer base wall provides improved impact resistance. The thickened dome and chime provide improved resistance to caustic cracking.

A preferred planar stretch ratio is 8–12:1 for a cylindrical sidewall of a polyester refill beverage bottle of about 0.5 to 2.0 liters/volume, and more preferably about 9–11:1. The hoop stretch is preferably 3–3.6:1 and the axial stretch 2.4–3:0. This produces a container sidewall with the desired abuse resistance, and a preform sidewall with the desired visual transparency. The sidewall thickness and stretch ratio selected depend on the dimensions of the specific bottle, the internal pressure (e.g., 2 atm for beer, 4 atm for soft drinks) and the processing characteristics of the particular material (as determined for example, by the intrinsic viscosity).

The cylindrical sidewall portion of the container which is blown to the greatest extent has the highest average percent crystallinity, normally about 15–25%. The tapered shoulder, which is also expanded substantially more than the base, normally has an average percent crystallinity of 13–20%. In contrast, the substantially thickened and lesser blown base has a crystallinity of about 0–10% in the dome and chime, and increases in crystallinity in the outer base moving upwardly towards the sidewall.

The neck finish is not expanded and remains substantially amorphous at 0–2% crystallinity.

Various levels of crystallinity can be achieved by a combination of expansion (strain-induced) and heat-setting (thermal-induced).

The preform and blown containers should be substantially transparent. A measure of transparency is the percent haze for transmitted light through the wall ($H_T$) which is given by the following formula:

$$H_T = [Y_d \div [Y_d + Y_s]] \times 100$$

where $Y_d$ is the diffuse light transmitted by the specimen, and $Y_s$ is the specular light transmitted by the specimen. The diffuse and specular light transmission values are measured in accordance with ASTM method D1003, using any standard color difference meter such as model D25D3P manufactured by Hunterlab, Inc. The container of this invention should have a percent haze (through the wall) of less than about 15%, preferably less than about 10%, and more preferably less than about 5%.

Several polyester polymers provide the desired clarity and physical properties necessary to produce refillable plastic containers. These polymers include polyethylene terephthalate (PET), polyethylene naphthalate (PEN), acrylonitrile, polyacrylate, and polycarbonate. Of the polymers commercially available, at present PET offers the best balance of properties and cost/performance ratios. PEN is produced by reacting dimethyl 2,6-naphthalate with ethylene glycol, and provides a higher $T_G$ and improved barrier properties over PET.

The thermoplastic polyester materials used in this invention are preferably based on polyalkylene, and in particular, polyethylene terephthalate (PET). PET polymers are prepared by polymerizing terephthalic acid or its ester forming derivative with ethylene. The polymer comprises repeating units of ethylene terephthalate of the formula As used herein "PET" means PET homopolymer and PET copolymers of the "bottle grades" suitable for making containers, which are well-known in the art. Thus, the PET copolymers may include a minor proportion, for example up to about 10% by weight, of monomer units which are compatible with the ethylene terephthalate units. For example, the glycol moiety may be replaced by an aliphatic or alicylic glycol such as cyclohexane dimethanol (CHDM). The dicarboxylic acid moiety may be substituted by an aromatic dicarboxylic acid such as isophthalic acid (IPA).

The intrinsic viscosity (IV) affects the processability of the polyester resin. Polyethylene terephthalate having an intrinsic viscosity of about 0.8 is widely used in the carbonated soft drink industry. Resins for various applications may range from about 0.55 to about 1.04, and more particularly from about 0.65 to about 0.85. Intrinsic viscosity measurements may be made according to the procedure of ASTM D-2857, by employing 0.0050±0.0002 g/ml of the polymer in a solvent comprising o-chlorophenol (melting point 0° C.), respectively, 30° C. Intrinsic viscosity is given by the following formula:

$$IV = (\ln(V_{Soln.}/V_{Sol.}))/C$$

where:
$V_{Soln.}$ is the viscosity of the solution in any units;
$V_{Sol.}$ is the viscosity of the solvent in the same units; and
C is the concentration in grams of polymer per 100 mls of solution.

The substantially amorphous preform should have a percent haze of no more than about 20%, preferably no more than about 10%, and more preferably no more than about 5%. The preform may be single layer or multilayer and made in accordance with the well-known injection mold processes, such as described in U.S. Pat. No. 4,710,118 granted Dec. 1, 1987 to Krishnakumar et al., which is hereby incorporated by reference in its entirety.

For example, a multilayer preform may have one or more barrier layers for $O_2$ and/or $CO_2$ retention, or include layers of recycled or post-consumer PET to reduce the cost. The barrier layer may be ethylene vinyl alcohol (EVOH) or polyethylene naphthalate (PEN).

Another multilayer preform which may be used in this invention for providing enhanced sidewall crystallinity is described in copending and commonly owned U.S. Ser. No. 07/909,961 filed Jul. 7, 1992 by Collette et al. entitled "Multilayer Refillable Container, Preform and Method Of Forming Same," and U.S. Ser. No. 08/082,171 filed Jun. 30, 1993 by Collette et al. entitled "Method of Forming Multi-Layer Preform And Container With Low Crystallizing Interior Layer," which are hereby incorporated by reference in their entirety. As described therein, the preform has a core layer of a first copolymer polyester and inner and outer layers of a second polyester, wherein the second polyester has relatively less copolymer and a rate of crystallization at least about 20% higher than the first polyester. For example, the first polyester may have from about 4–6% copolymer by total weight percent, and the second polyester no more than about 2% copolymer. The core layer results thermal induced haze during the injection molding process, and the inner and outer layers of the container provide an enhanced level of crystallinity.

Other factors important to the manufacture of refillable polyester beverage bottles are described in U.S. Pat. Nos. 4,334,627 to Krishnakumar et al. granted Jun. 15, 1982, 4,725,464 to Collette granted Feb. 16, 1988, and 5,066,528 to Krishnakumar et al. granted Nov. 19, 1991, which are hereby incorporated by reference in their entirety.

The materials, wall thicknesses, preform and bottle contours, may all be varied for a specific end product while still incorporating the substance of this invention. The container may be for pressurized or unpressurized beverages, including beer, juice and milk, or for non-beverage products.

The improved thermal resistance provided by this invention makes it particularly suitable for hot-fill containers. Hot-fill containers typically must withstand elevated temperatures on the order of 180–185° F. (the product filling temperature) and positive internal pressures on the order of 2–5 psi (the filling line pressure) without substantial deformation, i.e., a volume change of no greater than about ±1%. Other factors important in the manufacture of hot-fill containers are described in U.S. Pat. No. 4,863,046 to Collette et al. granted Sep. 5, 1989, which is hereby incorporated by reference in its entirety. The improved thermal resistance also makes this invention useful for containers which undergo pasteurization.

Thus, although several embodiments of this invention have been specifically illustrated and described herein, it is to be understood that variations may be made in the preform and container constructions, the materials, and the method of forming the preform and container without departing from the scope of the invention as defined by the appending claims.

What is claimed is:

1. A refillable plastic container for pressurized applications able to withstand at least 10 refill cycles including a caustic wash at a temperature of at least 60° C. and subsequent filling with a pressurized liquid at 4.0 atmospheres without crack failure, the container comprising:

a body having a substantially transparent biaxially-oriented sidewall, the body further including a base having a standing ring around a push-up dome with a dome center adjacent a central axis of the container, the dome and standing ring forming a thickened and substantially amorphous base for resistance to caustic stress cracking, and the dome having an outwardly concave exterior surface that extends from the standing ring and continues adjacent the central axis without an outwardly convex dish in order to prevent sprue cracking in the dome of the container.

2. The container of claim 1, wherein the plastic is polyester.

3. The container of claim 2, wherein the polyester is substantially polyethylene terephthalate (PET).

4. The container of any one of claims 1, 2, and 3, wherein the dome wall thickness is adapted to resist flexing of the dome during the alternating caustic wash and pressurized filling portions of the refill cycle.

5. The container of claim 1, wherein an interior surface of the dome has a continuous downward slope extending from the central axis to the standing ring.

6. The container of claim 5, wherein an interior dimple is disposed at the central axis of the base.

7. The container of claim 1, wherein the dome is substantially hemispherical.

8. The container of claim 1, wherein the container includes a layer of material selected from the group consisting of a barrier, high thermal stability, recycled PET, post-consumer PET, and polyethylene naphthalate (PEN).

9. A refillable plastic container for pressurized applications able to withstand at least 10 refill cycles including a caustic wash at a temperature of at least 60° C. and subsequent filling with a pressurized liquid at 4.0 atmospheres without crack failure, the container comprising:

a body having a substantially transparent biaxially-oriented sidewall, the body further including a base having a standing ring around a push-up dome with a dome center adjacent a central axis of the container, and the dome having an outwardly concave exterior surface that extends from the standing ring and continues adjacent the central axis without an outwardly convex dish in order to prevent sprue cracking in the dome of the container, wherein the base has a wall thickness defined by a ratio of the thickness of the dome center ($T_s$) to the thickness of the standing ring ($T_c$) on the order of 1.4 to 1.9.

10. The container of claim 9, wherein the dome center thickness $T_S$ extends for up to about 20% of the container diameter.

11. The container of claim 9, wherein the container has a base clearance defined by a ratio of the dome height (h) to the standing ring diameter (d) of at least on the order of 20%.

12. The container of claim 11, wherein the ratio h/d is on the order of 20% to 35%.

13. A refillable plastic container for pressurized applications able to withstand at least 10 refill cycles including a caustic wash at a temperature of at least 60° C. and subsequent filling with a pressurized liquid at 4.0 atmospheres without crack failure, the container comprising:

a body having a substantially transparent biaxially-oriented sidewall, the body further including a base having a standing ring around a push-up dome with a dome center adjacent a central axis of the container, wherein an exterior gate is disposed at the central axis of the base, the dome having an outwardly concave exterior surface with a continuous downward slope that extends from the standing ring to the gate without an outwardly convex dish in order to prevent sprue cracking in the dome of the container.

14. The container of claim 13, wherein the container can withstand at least 20 refill cycles in a caustic wash at a temperature of at least 60° C. without crack failure.

15. The container of any one of claims 1 and 14, wherein the container can withstand the designated refill cycles with a maximum volume change of about ±1.5%.

16. A refillable plastic container for pressurized applications able to withstand at least 10 refill cycles including a caustic wash at a temperature of at least 60° C. and subsequent filling with a pressurized liquid at 4.0 atmospheres without crack failure, the container comprising:
a body having a substantially transparent biaxially-oriented sidewall, the body further including a base having a standing ring around a push-up dome with a dome center adjacent a central axis of the container, and the dome having an outwardly concave exterior surface that extends from the standing ring and continues adjacent the central axis without an outwardly convex dish in order to prevent sprue cracking in the dome of the container, wherein the dome and standing ring form a thickened base portion having an average crystallinity of no greater than about 10%, and the sidewall has an average crystallinity of about 15 to 25%.

17. A refillable plastic container for pressurized applications able to withstand at least 10 refill cycles including a caustic wash at a temperature of at least 60° C. and subsequent filling with a pressurized liquid at 4.0 atmospheres without crack failure, the container comprising:
a body having a substantially transparent biaxially-oriented sidewall, the body further including a base having a standing ring around a push-up dome with a dome center adjacent a central axis of the container, and the dome having an outwardly concave exterior surface that extends from the standing ring and continues adjacent the central axis without an outwardly convex dish in order to prevent sprue cracking in the dome of the container, wherein the plastic is polyester, the dome and standing ring form a thickened and substantially amorphous base portion for resistance to caustic stress cracking, the base portion having an average crystallinity of no greater than about 10% and the sidewall having an average crystallinity of about 15–25%, the base portion having a wall thickness defined by a ratio of the thickness of the dome center ($T_s$) to the thickness of the standing ring ($T_c$) on the order of 1.4 to 1.9, the dome center thickness $T_s$ extending up to about 20% of the container diameter, and the container having the base clearance defined by a ratio of the dome height (h) to the standing ring diameter (d) of at least on the order of 20%.

18. The container of claim 17, wherein the polyester is substantially polyethylene terephthalate (PET).

19. The container of claim 17, wherein an exterior gate is disposed at the central axis of the base and the concave exterior surface of the dome has a continuous downward slope from the gate to the standing ring.

20. The container of claim 19, wherein an interior surface of the dome has a continuous downward slope extending from the central axis to the standing ring.

21. The container of claim 20, wherein an interior dimple is disposed at the central axis of the base.

* * * * *